United States Patent [19]
Peterson

[11] 3,945,924
[45] Mar. 23, 1976

[54] APPARATUS FOR IMPACT DISCHARGE OF FILTER CAKE FROM A MOVING FILTER MEDIUM AND FOR COMPACTING FILTER CAKE THEREON

[75] Inventor: C. Lynn Peterson, Salt Lake City, Utah

[73] Assignee: Peterson Filters & Engineering Company, Salt Lake City, Utah

[22] Filed: Feb. 24, 1971

[21] Appl. No.: 117,930

[52] U.S. Cl. ................................. 210/384; 210/396
[51] Int. Cl.² ......................................... B01D 33/02
[58] Field of Search ...... 210/391, 393, 396, DIG. 3, 210/DIG. 18, 66, 67, 77, 384; 55/290, 300

[56] References Cited
UNITED STATES PATENTS

| | | | |
|---|---|---|---|
| 2,232,618 | 2/1941 | Magill | 210/391 X |
| 2,395,499 | 2/1946 | Oliver et al. | 210/393 |
| 2,932,402 | 4/1960 | Logue et al. | 210/391 X |
| 3,321,892 | 5/1967 | Jacques | 55/300 X |
| 3,485,366 | 12/1969 | Evans | 210/393 |

Primary Examiner—John Adee
Attorney, Agent, or Firm—Bruce G. Klaas

[57] ABSTRACT

In mechanical filters, structure is provided for mounting a string-like member in closely spaced relation to its moving filter medium. At least one pick mounted on a rotating shaft is provided for periodically plucking the string-like member so that the string-like member vibrates against the filter medium. A rod mounted perpendicular to the path of movement of the filter medium past the string-like member acts as a guide to prevent the pick from catching the string-like member and controls the vibration of the string-like member in a plane substantially perpendicular to the path of movement of the filter medium thereby to obtain the most effect of the impact. The vibration or slapping of the string-like member against the filter medium causes filter cake formed thereon to be detached therefrom or to be compacted. In a belt-type of drum filter, the string-like member is preferably located between the breaker and discharge rolls.

22 Claims, 9 Drawing Figures

INVENTOR
C. LYNN PETERSON
BY
ATTORNEYS

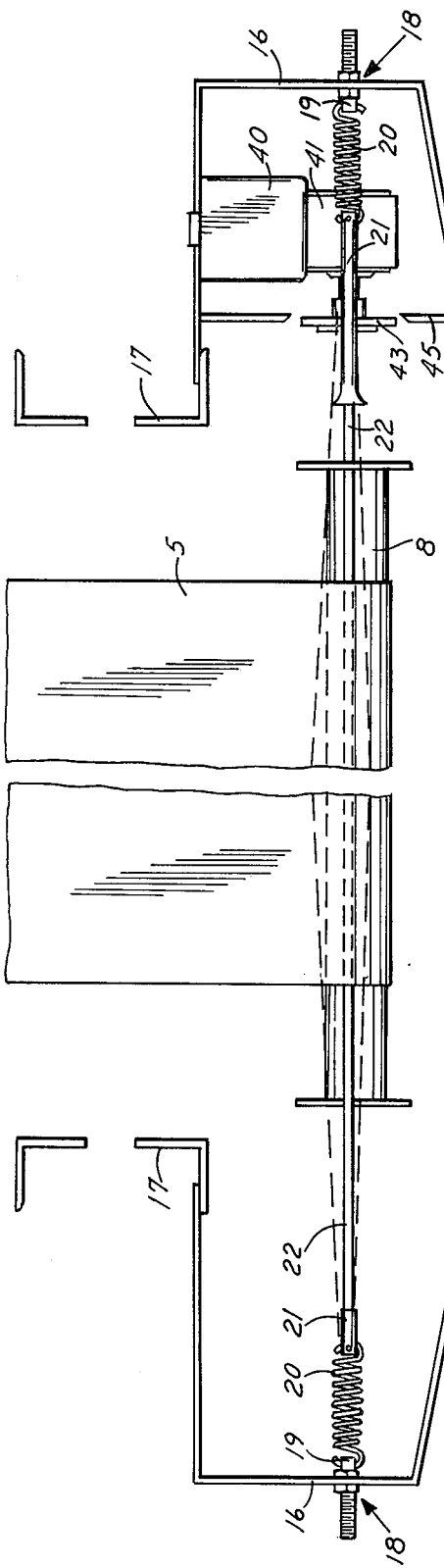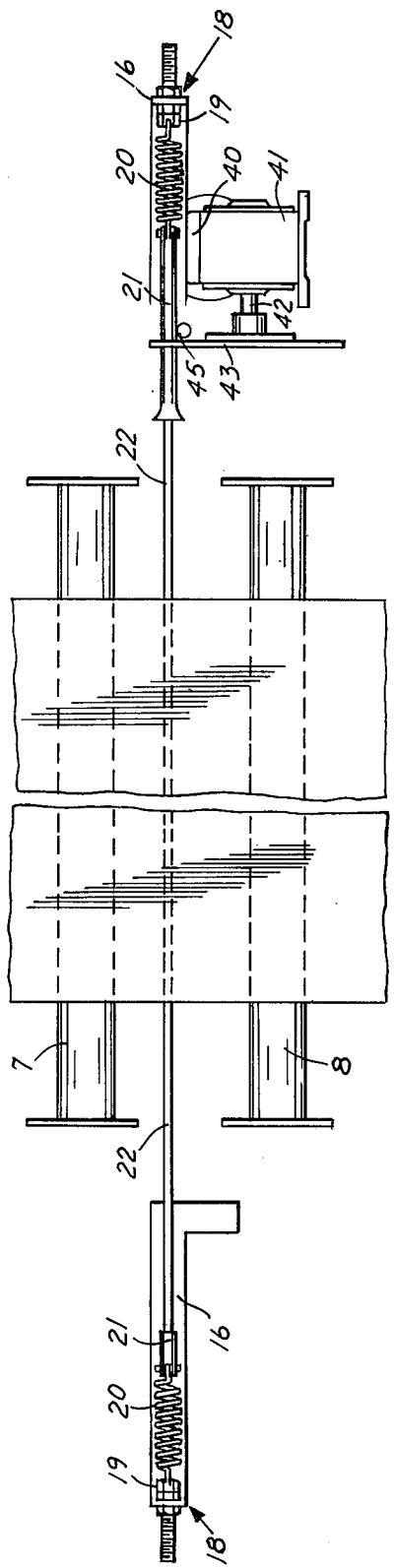

APPARATUS FOR IMPACT DISCHARGE OF FILTER CAKE FROM A MOVING FILTER MEDIUM AND FOR COMPACTING FILTER CAKE THEREON

The present invention relates to filters and more particularly to improved apparatus which may be employed for removing formed filter cake from the filter medium and which may be employed as a beater for compacting filter cake as it is formed on filter medium so as to prevent cake cracking.

The difficulty related to the discharge of cake from mechanical filters is the problem of complete filter cake discharge from the filter medium after filtration. Generally, in order to have complete cake discharge it has been found that the filter cakes formed on the filter medium must be thick enough to have sufficient weight or mass to fall off by gravity. Heretofore, it has not always been possible to form such thick filter cakes on the filter medium, particularly in the case of the filtration of products which were difficult to filter and consequently had slow filter rates.

Generally, belt-type drum filters are used in difficult filtering applications because the belt or cloth filter medium may be washed every revolution to prevent blinding. The terminology "blinding" of the filter medium is meant to describe the condition where a filter medium has its pores closed so that it no longer filters satisfactorily. Thin cakes formed on belt-type drum filters are now discharged by using a small diameter bar or roller to radically and quickly change the path of movement of the filter medium, thereby to cause cake formed on the filter belt to break free from the medium at a predetermined discharge point.

While the foregoing method of discharging cake from a filter medium works efficiently on some products, the condition of the filter cake must be just right in order for this method to work efficiently. For example, if the filter cake is not sufficiently dewatered, the cake remains plastic and does not always break free from the filter medium at the discharge point. Also, if the cake is not sufficiently thick, as particularly at the time when the filtration operation is completed, the filter cake often is not completely discharged from the filter medium and is not washed off by the sprays it accumulates on the rolls, thereafter causing the endless belt-type filter medium of a belt-type drum filter to have an unequal tracking length which may cause a malfunction of the belt guidance system. Therefore, the accumulation of filter cake on the rolls often requires shutdown of the filter, cleaning of the rolls supporting the filter belt or medium and another start-up of the filtration operation where the same difficulties may reoccur. Additionally, it has been found that the use of small diameter bars or rollers to radically and quickly change the path of movement of the filter medium poses a problem for the selection of the material used as the guide strips incorporated in the filter medium since the guide strips have to be hard enough to stand the pull of guide rollers yet flexible enough to bend around these small diameter bars or rollers.

Cake cracking is another difficulty related to mechanical filters. When the cake cracks in the dry zone, air short-circuits through the cracks so that the cake is not uniformly dewatered by air displacement resulting from the vacuum. Devices, such as rotary flappers, were thus developed for beating the filter cake as it was being formed in order to compact the filter cake and prevent cake cracking. A disadvantage, however, with such prior art beaters was that they were generally of such large dimension that they could not be spaced closely enough together to be effective. Additionally, such beaters were generally extremely noisy and very hard to maintain on drum filters having a width of greater than six feet.

It is, accordingly, an object of the present invention to provide an improved apparatus which may be employed for removing formed filter cake from the filter medium and also which may be employed as a beater for compacting filter cake as it is dewatered on the filter medium of a filter, which apparatus is characterized by being space-saving, dependable, and efficient in operation both for removing filter cake which is thin, sticky or not sufficiently dewatered and for compacting filter cake to prevent cracking.

It is, further, an object of the present invention to provide an improved apparatus as set forth which includes a string-like member which is vibrated against the filter cake or the filter media to transmit a slapping motion thereto, thereby to detach the formed cake after filtration therefrom or to compact the filter cake formed on the filter medium.

It is, additionally, an object of the present invention to provide an improved cake discharge apparatus as set forth which is easy and inexpensive to install and manufacture and is suitable for use in various other devices, such as, belt-type drum filters, standard drum filters and disc filters, for example.

It is, also, an object of the present invention to provide an improved filter cake discharging apparatus for belt-type drum filters which includes a vibrating string-like member in combination with discharge roll means.

In accomplishing these and other objects, there has been provided a belt-type drum filter, a standard drum filter and a disc filter with at least one bow string assembly according to the present invention incorporated in each of these mechanical filters. Each bow string assembly includes a string-like member or cord mounted in tension in a closely spaced relation to the moving filter medium of the filter with which it is associated along with actuating means in the form of a pick or other suitable means for plucking or vibrating the string-like member periodically or cyclically so as to vibrate the string-like member against a moving surface on the filter medium which may be the associated filter medium or the filter cake thereon. The vibrating string-like member transmits a slapping motion to the filter medium or filter cake and, depending on the location of the string-like member in the filtration cycle, either aids in discharging formed filter cake from the medium by detaching it therefrom, or compacts cake being formed on the filter medium to prevent cracking. Guide means, preferably in the form of a rod mounted at right angles to the path of movement of the moving filter medium, may be included in the bow string assembly to control the plane of vibration of the string-like member so that the string-like member strikes the filter medium or cake along a plane of motion substantially perpendicular to the filter medium. Additionally, an improved filter cake discharge apparatus according to the present invention is provided in the belt-type drum filter by the combination of the bow string assembly therein which is positioned to aid cake discharge along with the breaker and discharge rolls associated with the filter belt.

Thus, an improved apparatus is provided which may be employed in or as filter cake discharge apparatus for removing formed filter cake from a filter medium after filtration. Further, the improved apparatus may be employed as a beater for compacting filter cake as it is formed on the moving filter medium of a mechanical filter so as to prevent cake cracking.

A better understanding of the present invention may be had from the following detailed description when read in conjunction with the accompanying drawings, in which:

FIG. 3 is a top plan view of the bow string assembly of FIG. 2;

FIG. 4 is a front elevation view of the bow string assembly of FIG. 2;

Figure 8:
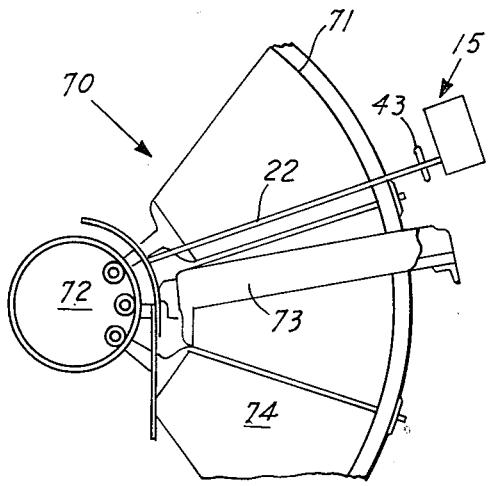
Figure 6:
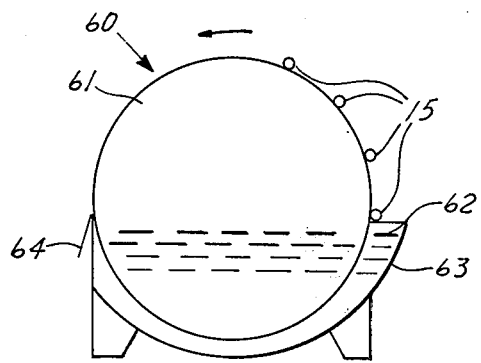
FIG. 6 is a side elevation view of a standard drum filter showing a plurality of bow string assemblies according to the present invention positioned to aid the formation of filter cake on the filter medium so as to prevent cake cracking.
Figure 7:
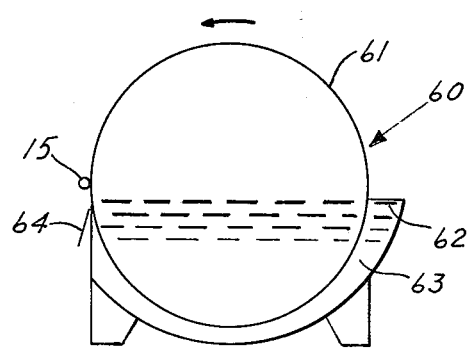

FIG. 7 is a side elevation view of the drum filter of FIG. 6 showing a bow string assembly according to the present invention positioned to aid filter cake discharge from the filter medium; and FIG. 8 is a side elevation of a portion of one disc of a disc filter assembly illustrating a bow string assembly according to the present invention positioned to aid filter cake discharge from the filter medium.

Figure 1:
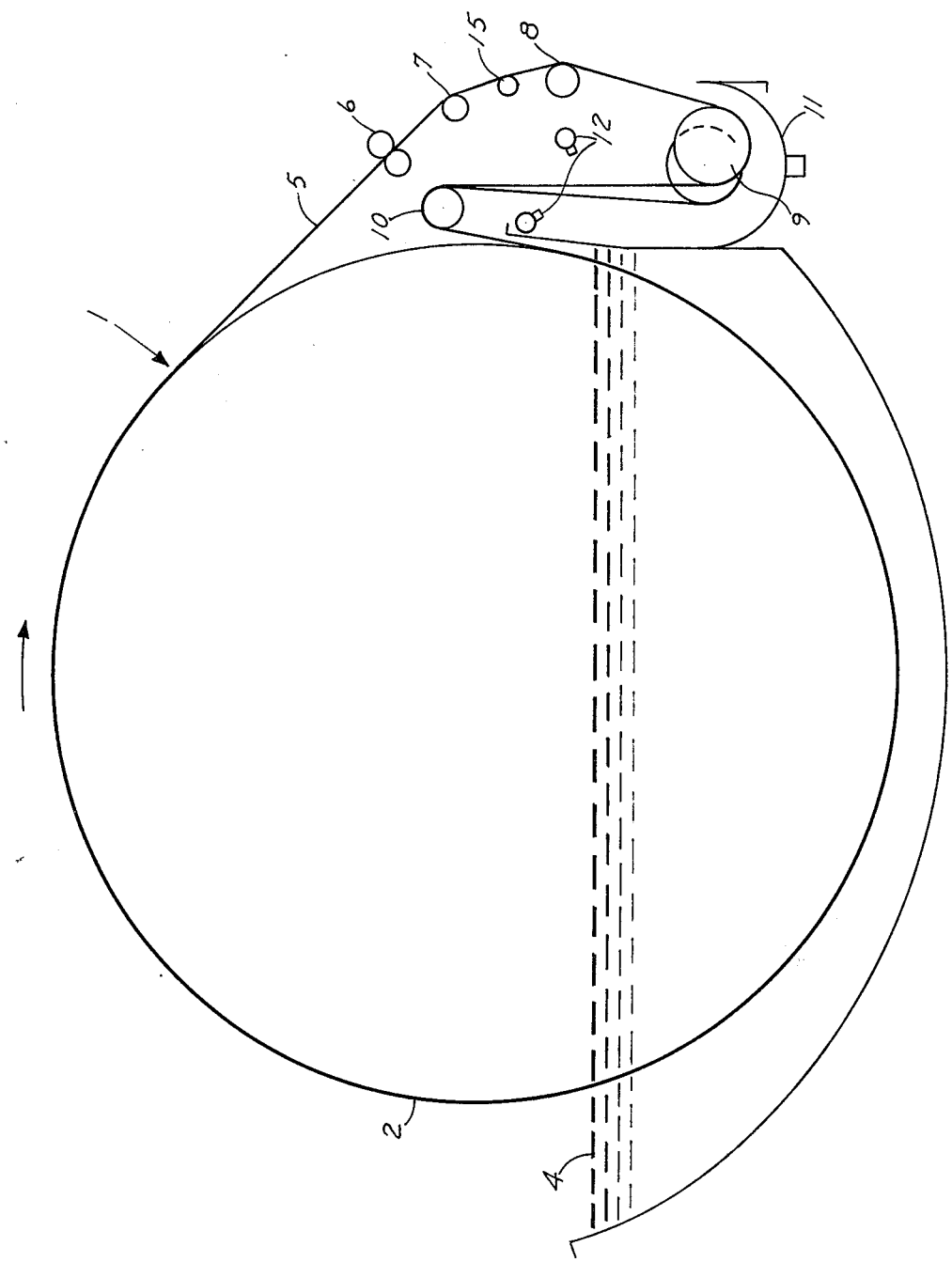
FIG. 1 is a side elevation view of a belt-type drum filter having apparatus according to the present invention for removing formed filter cake from the filter medium.

Referring to the drawings in more detail, there is shown in FIG. 1 a belt-type drum filter assembly generally designated by the numeral 1. The filter assembly 1 has a rotatable drum or rotor 2 which is rotated by conventional means (not shown) in the direction indicated by the directional arrow. The drum 2 is supported for rotation by support structure (not shown) in a tank 3 which holds the mixture 4 to be filtered. An endless filter belt 5 made of a conventional filter medium, such as a suitable cloth, is fitted around the outer periphery of the drum 2 and is driven by the rotating drum 2 so as to pass from the rotating drum 2 sequentially past a dual spring roller mechanism 6, a breaker roll 7, a discharge roll 8, a demooning roll or bar 9 and a return roll 10 back to the drum 2.

It is noted that the filter belt 5 passes in a substantially downwardly inclined straight line path from the drum 2 past the dual spring roller mechanism 6 which functions as a guide means for guiding guide strips incorporated in the filter belt 5 to the breaker roll 7. At the breaker roll 7, the path of the belt 5 is changed so that the belt 5 continues to follow a path away from the drum 2, but of even steeper incline, to the discharge roll 8. At the discharge roll 8, the path of the belt 5 is changed to an incline on the other side of vertical so that filter cake formed on the filter belt 5 is broken free from the belt 5 and discharges therefrom due to gravity. From the discharge roll 8, the path of the filter belt 5 is downward around the demooning roll 9 then upward to the return roll 10.

The demooning roll 9 is a V-shaped roll and functions to correct a condition called "center bias" of the filter belt. "Center bias" is caused by deflection in the rolls and imperfection in filter cloth fabric and is a change in the tracking length of the center of the belt, i.e., the tracking length of the filter belt center may be longer than its edges. As a result, the center of a filter belt tends to lag behind its edges so that a joint or joints in the belt take an upward curve called "mooning," thereby making the belt narrower. The demooning roll 9 straightens the belt out by being curved, i.e., having a pitch, to compensate for the "mooning" of the filter belt. The demooning roll 9 is located in a belt wash trough 11 and serves as a wash roll as well as a demooning roll. It is noted that the upper exterior edge of the trough 11 is located interior of the outer boundary of the discharge roll 8 so that discharged filter cake does not fall from the belt 5 into the trough 11. Water or another suitable fluid to wash the belt 5 is sprayed on the filter belt 5 by sprays 12 located on each side of the path of the belt 5 from the roll 9 to the return roll 10. At the return roll 10, the filter belt 5 passes therearound and then downward therefrom around the outer periphery of the drum 2.

As shown in FIG. 1, a bow string assembly 15 is located adjacent the filter belt 5 between the breaker roll 7 and the discharge roll 8. The bow string assembly 15 is shown in more detail in FIGS. 2–4. The assembly 15 includes mounting structure in the form of brackets 16 positioned on each side of the filter belt 5 outboard of the path of movement of the belt 5. These brackets 16 are secured to support structure 17 of the filter assembly 1. Mounted on the outer ends of each of the brackets 16 is an adjustable lock nut mechanism 18. Each lock nut mechanism 18 has an interior head portion 19 with a hole bored therein which provides a mounting arrangement for receiving the end of a conventional resilient means, such as a tension spring associated with at least one end of the string member. Hooked through these holes bored in the head portions 19 are the ends of resilient means preferably in the form of tension springs 20. It is additionally noted that the resilient means 20 could be provided by suitably arranged air cylinders or weights to develop cord tension. Tubular connectors 21 which are secured to the ends of a string-like member or cord 22 are hooked on the inner ends of the tension springs 20. Thereby, the string-like member 22 is supported inside the filter belt 5 in a closely spaced, and preferably parallel spaced, relation to the filter medium 5 so as to be strung in a manner similar to that of a bow string, i.e., under tension between spaced supports. It is noted that the string-like member 22 may be made of any suitable material, such as a cotton, nylon, rubber, neoprene or plastic cord of suitable diameter.

Figure 5A:
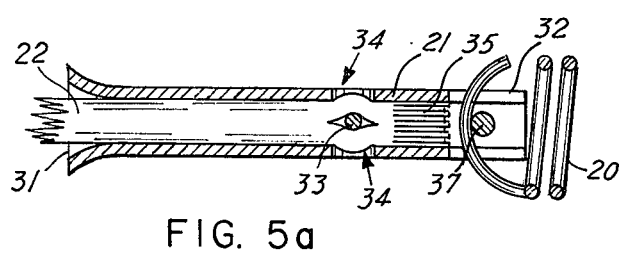
FIGS. 5a and 5b are each longitudinal views of one of the tubular connectors secured on the ends of the string-like member in the bow string assembly of FIG 2.
Figure 5B:
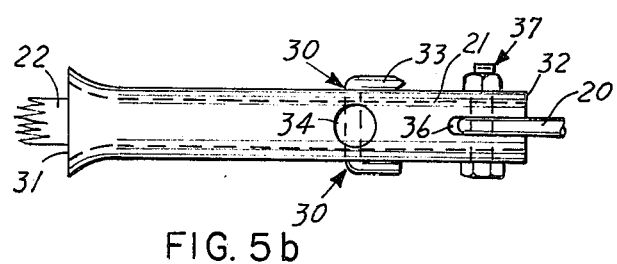

Referring to FIGS. 5a and 5b, the manner in which one of the tubular connectors 21 is secured on the end of the string-like member or cord 22 and hooked to the tension spring 20 is there illustrated. As there shown, the tubular connector 21 is a longitudinal cylindrical member having a hollow interior. The connector 21 is made of suitable material, such as rigid metal, and has a pair of facing holes 30 bored laterally through the connector 21 approximately midway between the connector ends 31 and 32. The holes 30 are dimensioned for receiving a drive pin 33. A second pair of facing holes 34, which are larger in diameter than the holes 30, are bored laterally in the connector 21 at substantially the same longitudinal plane in the connector 21 whereat the holes 30 are located. The holes 34 are preferably bored in the cylindrical periphery of the connector 21 at points spaced 90° apart from the holes 30. Additionally, the tip of the cord 22 is coated with a plastic-like material, such as epoxy, so as to have a solid or hardened tip 35.

To secure the connector 21 on the end of the cord 22, the cord 22 is inserted into the end 31 of the connector 21 until its tip 30 is positioned just beyond the holes 30 and 34. The pointed end of the drive pin 33 is then inserted in one hole 30 and driven through the cord 22 until a portion of the pin 33 protrudes from the other hole 30. The pin 33 is then bent over on both its ends flush with the outer periphery of the connector 21. Thereby, the pin 33 driven through the connector tube 21 acts as a holder against the epoxy sealed tip 35 of the cord 22 with material of the cord 22 bulging into the holes 34 to form an additional hold which locks the cord 22 in the connector 21. With the cord 22 thus secured in the connectors 21, the connectors 21 may be hooked on the ends of the tension springs 20. Longitudinal slots 36 are cut in the ends 32 of the connectors 21 and bolts 37 are mounted on the connector ends 32 to extend laterally thereacross substantially perpendicularly to the plane of the slots 36. Thereby, the connectors 21 may be hooked on the ends of the spring 20 by passing the spring ends through the slots 36 under and around the bolts 37.

Referring again to FIGS. 2-4, actuating means for the string member 22 comprising a conventional motor unit or means is there shown mounted within one of the brackets 16 adjacent the cord 22. The motor unit includes a motor 40 and a gear reduction unit 41 which is driven by the motor 40. The motor 40 and gear reduction unit 41 are supported by support structure (not shown) and are positioned with relation to the cord 22 so that the output shaft 42 of the reduction unit 41 preferably extends substantially parallel with the cord 22 when the cord 22 is at rest. Mounted on the end of the shaft 42 and outboard of the filter belt 5 is string member engaging means in the form of an elongated member or pick 43 which extends at right angles to the shaft 42 and is rotated by the shaft 42 at preferably 36 revolutions per minute so as to cyclically pluck or strum the cord 22. Preferably, the elongated member 43 is secured at its center on the shaft 42 so that both ends of the member 43 pluck the cord 22 as the shaft 42 rotates, thereby to pick the cord 22 72 times per minute. It is noted that the connector 21 adjacent the pick 43 is made of a sufficient length to fit around the area of the cord 22 where it is contacted by the pick 43 so as to provide a protective sleeve means fitted around that area of the cord 22 to protect the cord 22 from wear and has a smooth flared or bell connector end 31 which prevents the cord 22 from being abraded by its vibration relative to the connector 21.

In order to guide the vibration of the cord 22 and to prevent the cord 22 from catching on the pick and winding around the output shaft 42 as the pick 43 is rotated, guide means in the form of a guide bar or rod 45 is mounted on support structure (not shown) adjacent the cord 22 between the cord 22 and the output shaft 42 of the gear unit 41. The guide rod 45 is preferably mounted to extend substantially at right angles to the path of movement of the filter belt 5 past the cord 22 so that the cord 22 when vibrating against the filter medium 5 strikes the medium 5 along a path of motion substantially perpendicular to its surface in a slapping or spanking form of motion. The path of vibration of the cord 22 is shown by broken lines in FIGS. 2 and 3. It is noted that the force with which the cord 22 strikes the filter medium 5 may be adjusted in several ways. One way to control the striking force of the cord 22 is to adjust its tension by appropriately setting the lock nut mechanisms 18. Another way of adjusting the cord's striking force is by selectively setting the pick means formed by the pick 43 and the motor means driving it so as to control the amount the cord 22 is drawn back by the pick 43 before it is released for vibration against the filter medium 5.

Figure 2:
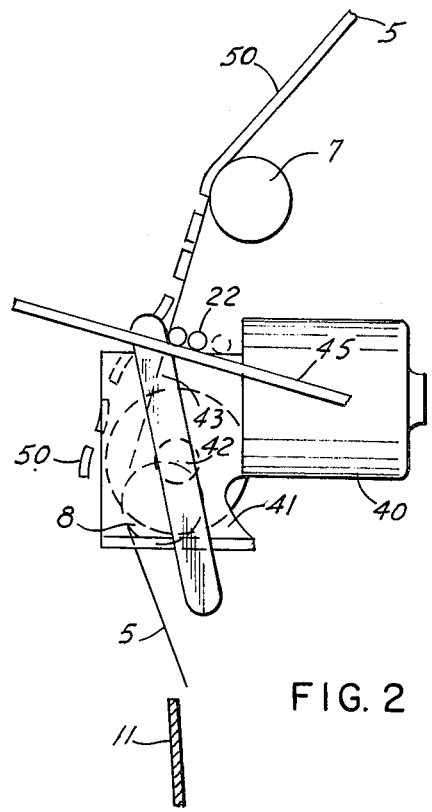
FIG. 2 is a side elevation view showing in detail the bow string assembly of the cake removal apparatus of FIG. 1.

In operation of the belt-type filter apparatus 1, the filter belt or medium 5 is rotated through the tank 3 by rotation of the drum 2 and vacuum is applied in a conventional manner so that filtrate is collected by the filter apparatus 1 and filter cake 50 is formed on the filter belt 5. Vacuum may be continuously applied to the filter cake on the belt 5 so as to remove as much filtrate as possible as long as the belt portion upon which the filter cake is formed contacts the drum 2. The belt 5 with the filter cake 50 formed thereon moves from the drum 2 across the dual spring roll mechanism 6 and the breaker roll 7. From the roll 7, the belt 5 with the formed cake 50 passes the bow string assembly 15 in which the cord 22 is being picked seventy-two times a minute so as to vibrate against the filter medium 5 and detach the filter cake 50 therefrom by vibrating it loose. The filter belt 5 is then rotated over the discharge roll 8 where its direction is changed sufficiently to discharge the filter cake 50 so that the cake 50 falls, as shown in FIG. 2, outside of the exterior edge of the wash collecting trough 11. The belt 5 is next rotated around the demooning or wash roll 9 where it is washed by the sprays 12. From the roll 9, the belt 5 moves past sprays 12 to be spray washed and the cleaned belt 5 is guided by the return roll 10 back to the drum 2 for another rotation through the tank 2.

Thus, the belt-type filter apparatus 1 with its endless filter medium 5 performs a continuous filtering operation wherein filter cake 50 is formed on the filter medium 5 and filtrate is removed from the filter cake 50 during the rotation of the belt 5 around the rotating drum 2. The filter cake 50 after filtration is then discharged by rotating the belt 5 sequentially across a breaker roll 7, past a cord 22 vibrating against the filter medium 5 and then around a discharge roll 8. From the discharge roll 8, the endless filter belt 5 is washed and guided back to the drum 2 to continue the continuous filtration process.

It is here noted that instead of using a pick to strum and vibrate the cord 22 that other suitable arrangements could be employed, such as large amplitude low frequency pneumatic or electric vibrators. Additionally, the pick or other suitable means for vibrating the cord 22 could be driven as a function of or by the motor means driving the filter 1 so that vibration rate of the cord 22 is variable and a function of the speed of the filter belt 5. Accordingly, it should be understood that the cord 22 may be vibrated at rates other than 72 vibrations per minute. For example, vibration rates in the range of 40 to 200 per minute may be used depending on operating conditions.

Referring now to FIGS. 6 and 7, there is shown a standard drum filter generally indicated by the numeral 60. The drum filter 60 rotates in a counterclockwise direction in FIGS. 6 and 7 as indicated by the directional arrows. The filter medium of the filter 60 is secured on the outer periphery of the rotating drum 61 in a conventional manner and a mixture 62 in a tank 63 is filtered in a conventional manner by rotating the drum 61 through the tank 63. In this filtration process, filter cake is formed on the filter medium as it is rotated in the tank 63. In order to prevent cracking of the filter cake on the filter medium in a dry zone a plurality of bow string assemblies 15 of the type before-described are shown positioned around the periphery of the drum 2 in FIG. 6 so that their vibrating cords 22 vibrate against the filter cake on the moving filter medium to compact the filter cake thereon and prevent cake cracking. It is noted that to perform this cake compacting operation the bow string assemblies 15 may be adjusted so that their cords 22 lightly strike the filter cake on the moving filter medium. The compacted cake after filtration is then removed from the filter medium by the scraper 64 mounted on the tank 63. In order to aid the scraper 64, a bow string assembly 15 may be positioned as shown in FIG. 7 just ahead of the scraper blade 64. This bow string assembly 15 would be adjusted so that its vibrating cord 22 would strike the cake on the filter medium with sufficient force to loosen it therefrom, thereby to aid the scraper and air blow in removing filter cake. Thus, a standard drum filter has been provided in which vibrating cord or stringlike members are vibrated against filter cake on a moving filter medium both for the purpose of compacting the filter cake to prevent cake cracking and for the purpose of aiding in filter cake removal from the filter medium.

Referring to FIG. 8, there is shown a portion of a conventional disc filter assembly 70. As shown in FIG. 8, the disc 71 of the filter 70 is rotated about a horizontal extending axis 72 downward across scraper blades 73. The scraper blades 73 which are located adjacent both the front and rear surfaces of the disc 71 remove filter cake from the filter medium 74 secured on the front and rear surfaces of the disc 71. In order to aid in filter cake removal from the filter medium 74, a bow string assembly 15, as before described, is shown mounted ahead of the front scraper blade 73 so that its vibrating cord 22 strikes the cake on the filter medium 74 to loosen it therefrom. It is noted that an identical bow string assembly 15 which is concealed is located adjacent the scraper blade 73 (also concealed) associated with the rear surface of the disc 71. Thus, a disc type filter assembly has been provided in which vibrating cords or string-like members are vibrated against filter cake on a moving filter medium to aid in filter cake removal.

Thus, an improved apparatus has been provided for use with mechanical filters which may be employed in or as a filter cake discharge apparatus for removing filter cake from a moving filter medium, or which may be employed as a beater for compacting filter cake as it is formed on a moving filter medium so as to prevent cake cracking. The apparatus provided includes a cord strung like a bow string adjacent a moving filter medium. Means are provided for picking the cord to vibrate it against the filter medium or the filter cake thereon and the striking force of the vibrating cord may be appropriately adjusted for either cake compacting or cake removal operations. A guide bar is provided for guiding the vibration of the cord against the surface of the filter medium. While preferably the vibration of the cord is guided to strike the medium or cake at substantially a right angle to its surface, the cord may be guided to strike the cake or medium at other suitable angles when a lesser impact effect is desired. Additionally, one or more vibrating cords may be used, as suitable, for a cake compacting or discharge operation since the cord and its associated mechanism are space-saving. It will be understood that on wider filters, 20 feet or more, it may be preferable to locate a pick at both ends of the string bow.

I claim:
1. Apparatus for removing formed filter cake from a moving filter medium, comprising:
   at least one string-like member;
   structure mounting said string-like member in tension adjacent said moving filter medium; and
   actuating means for repetitively moving said string-like member into and out of engagement with a moving surface on said filter medium.
2. The invention recited in claim 1 and wherein:
   said actuating means for repetitively moving said string-like member is periodically operable to engage and further tension said string-like member by movement away from said moving surface and then release said string-like member to cause a return movement into forcible engagement with the moving surface.
3. The invention recited in claim 2 and wherein:
   said actuating means for repetitively moving said string-like member is operable to move said string-like member relative to the moving surface in a plane substantially perpendicular thereto.
4. The invention recited in claim 1 and wherein said actuating means for vibrating said string-like member comprises:
   string engaging means for intermittently engaging and moving said string-like member relative to said filter medium; and
   motor means for rotating said string engaging means and causing periodic contacting between said string-like member and said string engaging means.
5. The invention recited in claim 4 and wherein:
   said string-like member is mounted by said structure in generally parallel and closely spaced relationship to the moving surface on said filter medium and including:
   guide means to engage said string-like member as it is moved by string engaging means and guide said string-like member toward the moving surface in a plane substantially perpendicular to the moving surface.
6. The invention recited in claim 5 including resilient means mounting at least one end of said string-like member on said structure.
7. The invention recited in claim 5 and wherein:
   said string-like member has at least one hardened end portion,
   a tubular connector fitted around said end portion,
   a pin driven laterally through the tubular connector to pass through said string-like member below its hardened end portion whereby said pin secures the hardened end portion of said string-like member in said tubular connector,
   said tubular connector having openings therein adjacent said pin to accommodate the expansion of said string-like member caused by the passage of said pin therethrough so that the openings defined in said tubular connector cooperate with said pin to secure said tubular connector on the end of said string-like member, resilient means connected to said tubular connector for attaching said tubular connector to said structure, and said tubular connector providing protective sleeve means fitted around said string-like member at the region of contact with said string engaging means for protection from excessive wear.

8. The invention recited in claim 5 wherein:

said string-like member has a substantially solid end portion, a tubular connector fitted around said end portion, a pin driven laterally through said tubular connector to pass through said string-like member below its solid end portion whereby said pin secures the solid end of said string-like member in said tubular connector, said tubular connector having an opening therein adjacent said pin to accommodate the expansion of said string-like member caused by the passage of said pin therethrough so that the opening defined in said tubular connector cooperates with said pin to secure said tubular connector on the end of said string-like member, resilient means connected to said tubular connector for attaching said tubular connector, and said tubular connector being located at the area of engagement with said string engaging means for protection from excessive wear.

9. The invention recited in claim 1 wherein:

said string-like member is mounted by said structure adjacent the side of said filter medium upon which filter cake is formed for movement relative to said side and against the filter cake formed thereon.

10. The invention recited in claim 1 wherein filter cake is formed on one side of said filter medium and said string-like member is mounted by said structure adjacent the other side of said filter medium for movement relative to and against said other side to discharge filter cake from the one side of said filter medium.

11. The invention recited in claim 1 including guide means mounted transversely to the path of movement of said filter medium to engage said string member to control the path of movement of said string-like member whereby to guide said string-like member so that it moves in a path substantially perpendicular to the moving surface of said filter medium.

12. In filtration apparatus having a moving filter medium, at least one string-like member extending across a portion of said filter medium, support means for said string-like member holding said string-like member in tension and in closely spaced relation to said filter medium and actuating means for engaging and moving said string-like member relative to said filter medium, and being operable to cyclically contact said string-like member whereby to move said string-like member to an extended portion of increased tension so that upon release said string-like member repetitively forcibly moves toward and intermittently strikes a moving surface on said medium.

13. The invention recited in claim 11 wherein:

said string-like member being supported in substantially parallel relation to the moving surface on said medium, guide means for controlling the path of movement of said string-like member, said guide means being mounted with relation to said moving surface and said string-like member so that said string-like member moves in a plane substantially perpendicular to said moving surface against which it vibrates and strikes in motions at substantially right angles to the path of movement of said moving surface.

14. The invention recited in claim 13 wherein:

said guide means comprises at least one rod mounted adjacent said string-like member at substantially a right angle to the moving surface of said medium.

15. The invention recited in claim 12 and having:

a plurality of said string-like members spaced apart one from the other along said moving surface.

16. The invention recited in claim 12 and having:

at least one string actuating means for said string-like member located at each end of the string-like member.

17. In a belt-type filter wherein filter cake is formed on an endless moving belt-like filter medium and discharged from the moving surface of said medium, the invention comprising:

at least one string-like member;

structure mounting said string-like member in tension adjacent said moving medium; and actuating means for forcibly vibratably moving said string-like member against a moving surface on said moving medium whereby to detach attached filter cake therefrom.

18. The invention recited in claim 17 wherein said endless belt-like filter medium is mounted on roller means for movement in a continuous filtration cycle, said roller means including:

a breaker roll to break cake formed on said medium as said medium is moved across said breaker roll; and a discharge roll which changes the direction of movement of said medium sufficiently to discharge detached broken cake therefrom; and wherein:

said string-like member being mounted adjacent said medium between said breaker roll and said discharge roll.

19. The invention recited in claim 18 including guide means for controlling the plane of movement of said string-like member, said guide means being mounted with relation to said medium and said string-like member so that said string-like member moves in a plane substantially perpendicular to the moving surface on said medium against which it vibrates.

20. In a drum filter wherein filter cake is formed on filter medium secured around the outer periphery of a rotating filter drum, the improvement of means for discharging filter cake therefrom or compacting said cake comprising:

at least one string-like member;

structure mounting said string-like member in tension adjacent said medium; and at least one actuating means for vibrating said string-like member against the cake formed on said medium.

21. In a disc filter wherein filter cake is formed on filter medium secured to the front and rear surfaces of a rotating filter disc, the improvement of means for discharging filter cake from the filter medium comprising:

at least one string-like member for the front and for the rear surfaces of said filter disc;

structure mounting each of said string-like member in tension adjacent the filter medium secured on the surface of said filter disc with which it is associated; and actuating means for vibrating each of said string-like member against the cake formed on its associated filter medium.

22. Apparatus for use in discharging formed filter cake on a moving filter medium, comprising:
a string-like member;
structure means for mounting said string-like member in tension adjacent the moving filter medium so that said string-like member may be vibrated thereagainst, and
actuating means for mechanically vibrating said string-like member into and out of engagement with a moving surface on the moving filter medium.

* * * * *